United States Patent [19]

Sigurdsson

[11] 4,113,846
[45] Sep. 12, 1978

[54] METHOD OF PRESSURE TREATMENTS OF MATERIALS

[75] Inventor: Per Arne Sigurdsson, Askloster, Sweden

[73] Assignee: Sigurdssons Mek. Verkstad, Askloster, Sweden

[21] Appl. No.: 778,565

[22] Filed: Mar. 17, 1977

Related U.S. Application Data

[63] Continuation of Ser. No. 504,969, Sep. 11, 1974, abandoned.

[51] Int. Cl.² .............................................. C01B 31/06
[52] U.S. Cl. ..................................... 423/446; 423/659; 425/DIG. 26; 425/77
[58] Field of Search ............... 423/446, 659, 290; 425/77, DIG. 26, 405 R, 405 H; 264/340, 349

[56] References Cited

U.S. PATENT DOCUMENTS

| | | | |
|---|---|---|---|
| 3,031,269 | 4/1962 | Bouenkerk | 423/446 |
| 3,123,862 | 3/1964 | Levey | 425/77 |
| 3,674,403 | 7/1972 | Jonsson et al. | 425/77 |
| 3,676,069 | 7/1972 | Kennedy | 423/446 |

FOREIGN PATENT DOCUMENTS

1,292,641 10/1972 United Kingdom.

Primary Examiner—Edward J. Meros
Attorney, Agent, or Firm—Harness, Dickey & Pierce

[57] ABSTRACT

A method of increasing to a predetermined value the pressure exerted on materials treated in high pressure chambers. A first pressure-exerting force is used to act on the material throughout the entire treatment process and a second pressure-exerting force is used to act on a limited amount of a pressure compensating medium. The two pressure-exerting forces are interdependent whereby any tendency to change of the pressure exerted on the material inside the pressure chamber automatically brings about a proportional change of the pressure of the compensating medium, whereby the pressure in the high-pressure chamber is maintained at the desired level. The method is primarily but not exclusively intended for the production of synthetic diamonds. The invention also concerns an apparatus for performing the method, including first pistons exerting a pressure on the material inside the pressure chamber, a closed space holding said limited amount of the pressure compensating medium, and a second pressure-exerting means applying a pressure on said compensating medium, said two pressure-exerting means being interconnected to move concordantly to effect the pressure regulation.

1 Claim, 8 Drawing Figures

METHOD OF PRESSURE TREATMENTS OF MATERIALS

This is a continuation of application Ser. No. 504,969 filed Sept. 11, 1974, now abandoned.

BACKGROUND OF THE INVENTION

The present invention concerns a method of the kind defined in the preamble of claim 1 to maintain the pressure at the desired level in high-pressure chambers during pressure treatments. The invention is especially but not exclusively applicable to the manufacture of synthetic diamonds.

The constitutional diagram for carbon and the phase curve concerning the constitutions of graphite and diamond are on the whole well known to-day and have proved very helpful in the attempts to manufacture synthetic diamonds and it is now possible to manufacture synthetic diamonds suitable for industrial use on the basis of graphite in high-pressure apparatuses which develop extremely high pressures during the manufacturing process.

Prior-art high-pressure apparatuses designed for diamond manufacture usually comprise an inner pressure chamber, a pressure-absorbing device surrounding the pressure chamber and one or several, usually two, pressure pistons which are displaceable in the direction towards the chamber centre while reducing the volume of the chamber for the purpose of compressing a graphite body disposed inside the chamber. The pressure exerted by the pressure pistons is not always transmitted directly to the graphite body but may be transmitted via an elastic sealing material, such as rubber or similar material. Another common sealing material is pyrophyllite which is an aluminium silicate material which is capable of forming a sealing medium when pressed into voids.

In theory it is possible to convert graphite into diamond by exposing the graphite to pressures and temperatures within the diamond-stable range of the carbon phase diagram in accordance with the theory expressed by Berman and Simon (Zeitschrift fer Electrochemie, 59, p. 355 1955). Later research (by e.g. ASEA and General Electric Company) has established the existence of both diamond-stable areas and areas with stable carbon of non-diamond character within the carbon phase area and contrary to findings by earlier scientists one has assumed lately that mere submission of carbon and non-diamond character to conditions of such a nature that it falls within the diamond-stable area of the phase diagram fails to meet the requirements necessary for conversion of carbon to diamond. To meet all requirements it is assumed in accordance with the Swedish Pat. No. 215 013 granted to General Electric Company that also a catalyst must be present. This thought is supported by Japanese scientists (see Swedish Pat. Nos. 328 856, 330 005, 338 760) but was later abandoned by General Electric Company (see Swedish Pat. Specification No. 333 137) which company now is said to have established that hexagonal shapes of diamond may be manufactured at high pressures and temperatures in the absence of catalysts. The last-mentioned Swedish Pat. Specification No. 333 137 thus suggests the introduction into a high-pressure/high-temperature apparatus of a quantity of graphite wherein the crystalline domains are comparatively large and perfect and the c-axes predominantly in aligned relationship in a certain direction, whereby the graphite is orientated in the apparatus in such a manner that the direction of the c-axes orientation becomes essentially aligned with the effect of the pressure force. By exposing the material to a variable high pressure which is at least as high as the pressure of the three-phase equilibrium point (the so-called tripple point) between solid diamond, solid graphite and liquid carbon, and by elevating the material temperature to at least 3000° C, hexagonal diamonds are obtained in the graphite mass when the latter is allowed to resume the environmental pressure and temperature.

Following extensive studies of the carbon phase diagram one believes to have established with certainty the existence of one area where both graphite and metastable diamond may exist, of one area where diamond and metastable graphite exist, of one high-temperature area where only graphite exists, of one high-pressure area where diamond is the only existing phase, of one area of even higher pressure where carbon (diamond) exists in metallic form, and of one pressure/temperature area where only liquid phases exist.

Alongside with the studies of the carbon phase diagram, high-pressure apparatuses have been developed which largely have made these studies possible. These apparatuses may be divided into two main types. The apparatuses in accordance with the first main type consist in principle of a hollow pressure cylinder and two pressure pistons. The cylinder is in general surrounded by several concentric sections forming a band or girdle of a shrinkage fit consisting of continuous or sectional steel rings. The pressure pistons are inserted into the cylinder chamber forming the high-pressure chamber from each end of the pressure cylinder cavity, and a reaction mass (graphite when synthetic diamonds are to be manufactured) is positioned in the centre of this high-pressure chamber, surrounded by a concentric cover of pyrophyllite. The entire apparatus is placed in a hydraulic press and the pressure pistons are forced into the cylinder cavity towards one another. The contents in the centre will thus be compressed and part of the pyrophyllite will be forced out into the spaces between the pistons and the cylinder. Pyrophyllite possesses the characteristic that its internal friction increases considerably upon pressure increase. The pyrophyllite thus displaced into the spaces builds up a resistance against further displacement, thus forming a sealing rendering possible further compression of the rest of the contents in the high-pressure chamber. Electric current is used to increase the temperature and may be led directly through the reaction mass, if the latter consists of graphite.

Apparatuses of the second type are distinguished from the first-mentioned type primarily in that no sealings of pyrophyllite or equivalent substances are used. In the centre of the apparatus is arranged a steel cylinder containing two chambers of different size, the smaller one being a high-pressure chamber and the larger one arranged to provide a hydrostatic support pressure for the pressure pistons which are urged into the high-pressure chamber while compressing the contents thereof. A number of conical pistons are positioned around the cylinder, each one of said pistons fitting into its respective one of conical holes formed in an outer cylinder. The pressure is obtained in that the pistons (six as a rule), together with a block covering the inner cylinder, are forced into their respective conical hole in the outer cylinder. The inner cylinder including the high pressure chamber is compressed radially and axially. The material to be treated is compressed in the high-pressure chamber and the required heat is obtained through electric resistance members or through direct electrical heating.

A feature common to all these known methods and apparatuses is that the pressure exerted on the reaction material is to be brought to a certain value at a certain temperature and that the material is to be maintained at this pressure and at this temperature over a certain length of time. The lowest pressure is determined by the chosen working temperature and because it is necessary to maintain a comparatively high temperature to achieve the phase conversion within a reasonable time, it is also necessary to use a correspondingly high pressure. The effects of the volume reduction to which the reaction material is subjected during the conversion phase into diamond have, however, been neglected, which may be due to the fact that it has been considered possible to use sufficiently high pressures to remain at the right side (above) the equilibrium line of the phase diagram under all circumstances. The risk of falling below the critical pressure at the prevailing temperature when the reaction (phase conversion) is initiated is avoided in this manner, but the product obtained is unavoidably poorer from a quality point of view and it also becomes necessary to use equipment having an unnecessarily large pressure capacity, resulting in unnecessarily large energy consumption to generate the required pressure.

BRIEF DESCRIPTION OF THE DRAWINGS

The invention will be described more in detail in the following with reference to the accompanying drawings, wherein.

DETAILED DESCRIPTION OF A PREFERRED EMBODIMENT

Figure 1:
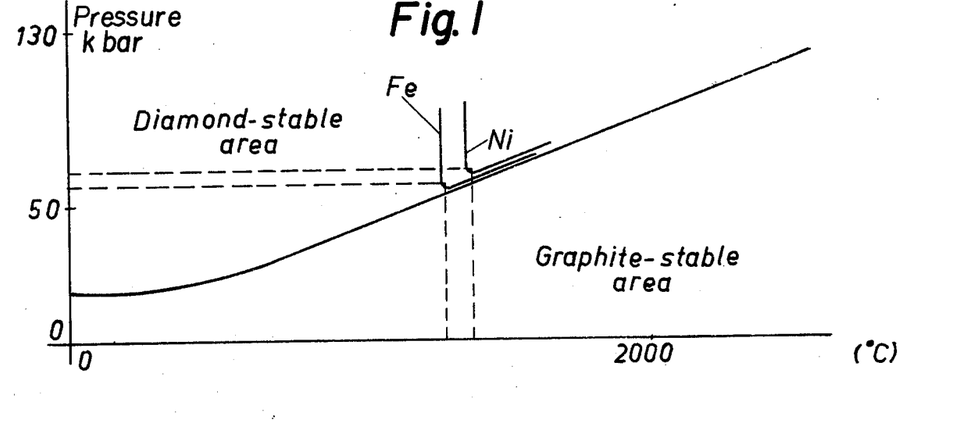
FIG. 1 illustrates a temperature/pressure diagram showing the equilibrium line for the diamond and graphite phases.

As appears from the aforegoing the conversion of graphite into diamond may be facilitated if a suitable catalyst is used. Several catalysts for this purpose are mentioned in patent publications (see e.g. Swedish Pat. Specifications Nos. 215 013; 324 355; 339 459; and 328 856; 330 004; 330 005; 338 766). The pressure/temperature diagram of FIG. 1 illustrates a section of the curve extrapolated by Berman and Simon, the so-called phase curve, relating to the two carbon phases graphite and diamond. The area above the curve designates the diamond-stable area and the area below the curve the graphite-stable area but intermediate these areas there is a metastable area for diamond and metastable graphite, and graphite and metastable diamond, respectively (see e.g. the patent specifications referred to above or the carbon phase diagram appearing in the article "Synthetic Diamonds" in 'Kosmos' 1965). The exact extension and importance of this area are not fully explored but in principle do not influence the present invention.

Carbonaceous substances do not, as mentioned before, without further convert into diamond solely by being maintained within the diamond-stable area at pressures and temperatures above the critical pressures and temperatures defined by the phase curve, i.e. at least within the more easily accessible pressure and temperature ranges graphite and other carbonaceous substances seem able to remain at the pressures and temperatures in question for an indefinite period of time without any conversion occurring. By using catalysts together with pressures and temperature conditions suitable for these catalysts, such conversion into diamond is, however, facilitated, and in FIG. 1 the conversion area in the presence of an iron catalyst is defined by means of a curve designated Fe. In general, other catalysts such as nickel, give other curves, e.g. a Ni-curve for nickel which lies above the Fe-curve.

It has been found that when diamonds are manufactured from graphite within the conversion area for the Fe-curve (and Ni-curve and possibly also other catalyst curves) the quality becomes poorer the more the pressure and the temperature are increased within the diamond-stable area, at least within the pressure and temperature ranges so far established with some certainty with the aid of the equipment hitherto available. This paradox is supposed to be due to the fact that the conversion speed increases with the increase of pressure and temperature and thus gives rise to a seemingly immediate development of microscopic diamond crystals at all points of the graphite, whereupon agglomeration occurs of the microscopic diamond crystals in combination with sintering in which take part the graphite and the metallic catalyst. By operating within the first section of the triangular curve defined by the catalyst, e.g. the Fe-curve as close to the corner of the triangle as possible, the conversion into diamond takes place at a slower pace and one obtains a crystal growth which from a quality point of view is superior to the diamond crystals that are formed initially.

Figure 2:
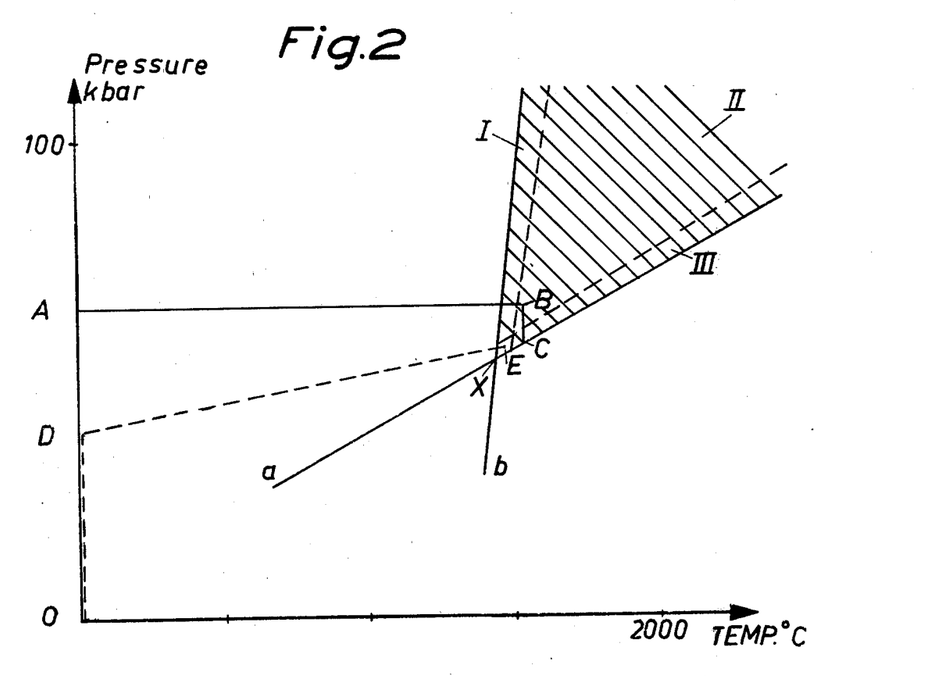
FIG. 2 is a second phase diagram for graphite/diamond.

Modern equipment to produce high pressures and simultaneously high temperatures makes it possible to maintain a predetermined pressure at a definite temperature for very brief periods only. Controlled phase conversions thereof are difficult to carry out at these high pressures and temperatures. In e.g. the manufacture of industrial diamonds using known methods it is impossible to compensate satisfactorily for the reduction in volume which is caused by the formation and growth of diamonds. FIG. 2 shows in a very simplified manner a phase diagram on graphite/diamond wherein the area above the line $a$, i.e. the equilibrium line, represents the diamond-stable phase, and the area below line $a$ the graphite-stable one. Line $b$ is determined by the kind of catalyst used.

The hatched area may be divided into three zones as shown in FIG. 2 that are not clearly or strictly defined. They are orientated towards the point X. In zone II crystals are formed that grow quickly. The number of the crystals and the speed of their growth increase with increase of pressure and temperature but the quality of the crystals becomes correspondingly poorer. In zone I, the number of crystals formed is less and the rate of growth lower. In zone III, conditions are more favourable than in zone II and the closer to point X it is possible to operate, the larger the monocrystals grow and in addition the strength and quality of the diamond are increased.

At present, one operates along line OABC, i.e. the pressure is accelerated to A, whereupon energy is added to the reaction mass and the temperature increased under constant pressure to B. The temperature at this point is sufficiently high for diamond to begin to form and grow during which the pressure drops to C. At point C, diamond growth ceases and the process is interrupted.

In high-pressure equipment in accordance with the present invention pressures and temperatures may be regulated so as to follow an arbitrary predetermined curve, e.g. the one indicated with the interrupted line ODE. In this case, the pressure is first increased to D and thereafter it is increased along with the temperature to E or any other desired predetermined point in the diagram. At E, diamond is formed and grows while submitted to a certain pre-set pressure which may be maintained or regulated as a function of time. The possibility of controlling the process over a longer period thus gives favourable diamond grain growth and the desired size and quality of the diamond grains. Diamond grains suitable for polishing purposes are formed in a few seconds, whereas grains for grinding discs require minutes and in the case of controlled growth of diamonds intended for tools of type rock drills a considerable longer time is usually required.

In addition to the unique possibility of regulating the pressure/temperature and keep them constant there is also the added considerable advantage of being able to choose a rise of pressure and temperature which as far as press tools, sealings, gaskets and other details of the equipment are concerned is less hard from the stress point of view.

Figure 3:
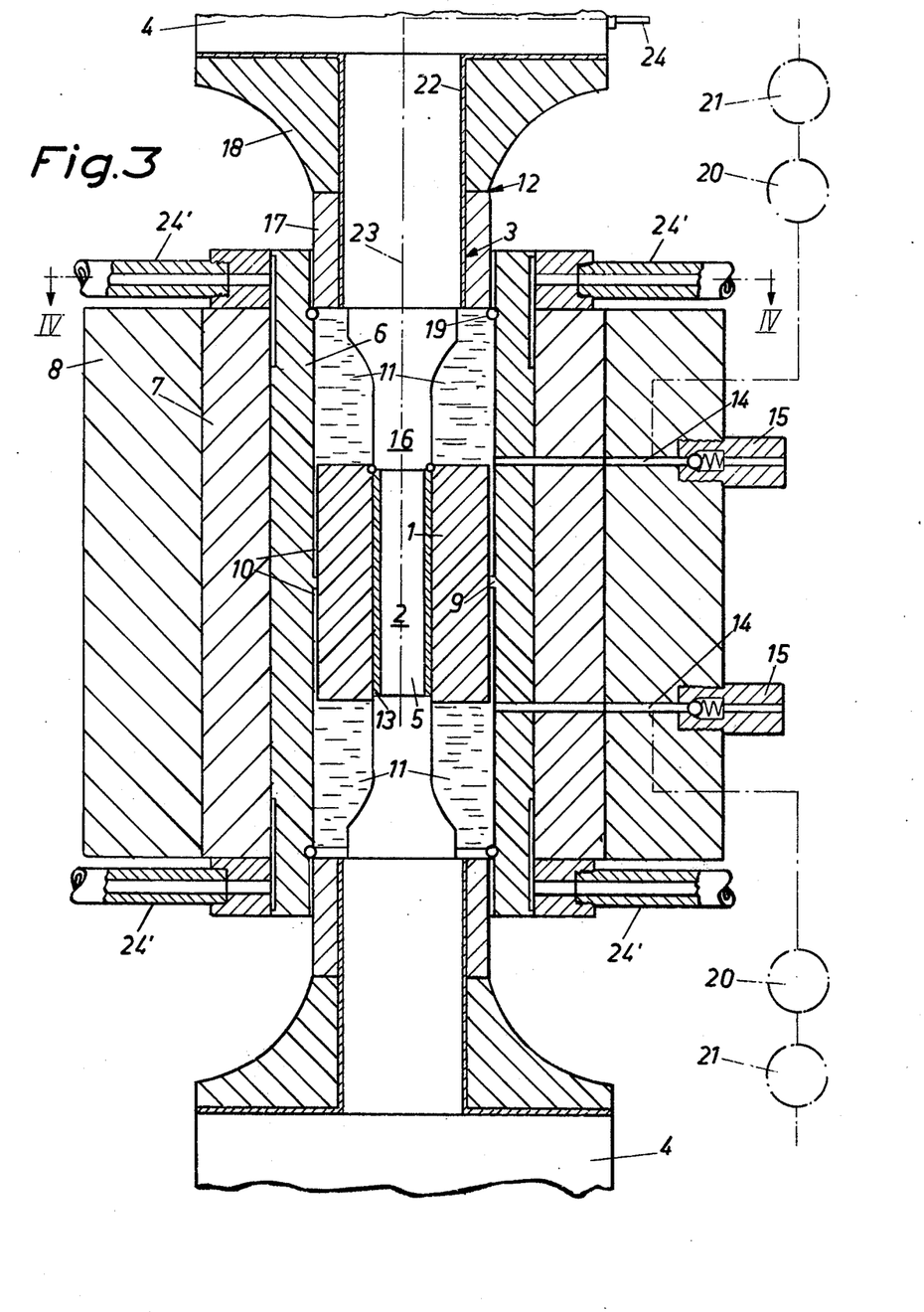
FIG. 3 illustrates schematically a longitudinal section through an apparatus designed for the performance of the method in accordance with the invention.
Figure 4:
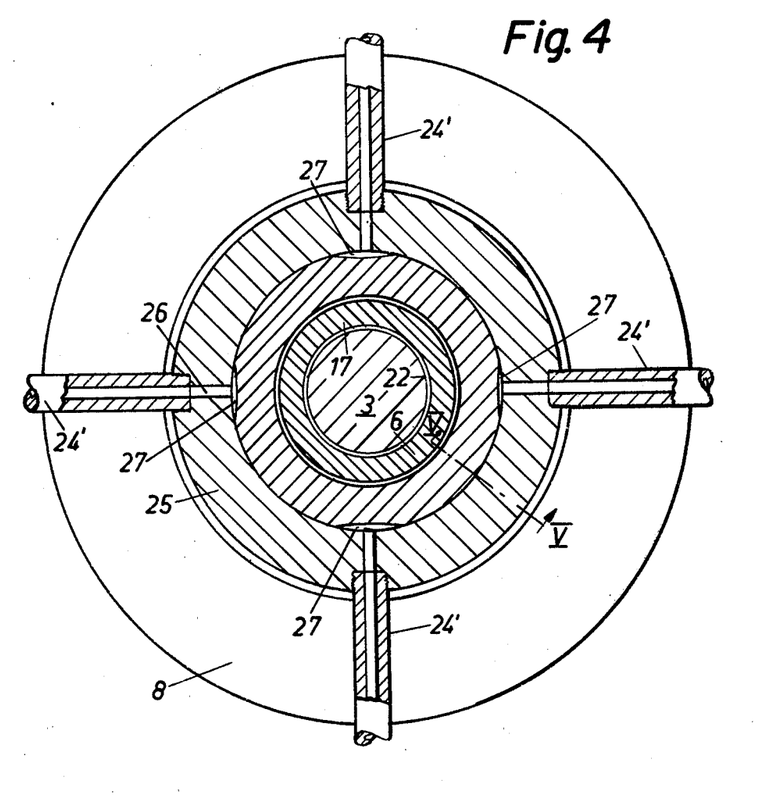
FIG. 4 is a cross-sectional view along line IV—IV of FIG. 3.
Figure 5:
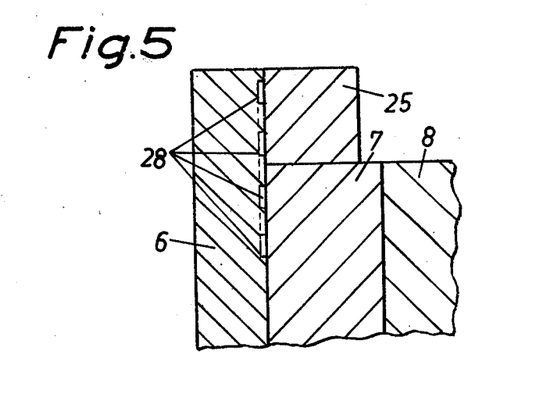
FIG. 5 is a section along line V—V of FIG. 4.

FIG. 3 shows the structural principle of the apparatus and below follows a description of its function.

As indicated above, it has proved difficult to maintain particularly the pressure within the optimum section of the Fe-curve (or any other desired, defined portion of the diamond-stable area) on account of the changes of volume of the reaction material (graphite or other carbonaceous material) during the phase conversion into diamond which has a much higher density than graphite (the density for diamond is between 3.51 and 3.53 whereas the density for graphite is approximately 2.1 to 2.2). If one operates at pressures and temperatures within but very close to the corner section of the Fe-curve, i.e. at the optimum point, the phase conversion into diamond and the decreased volume of the reaction material, caused thereby may give rise to a pressure decrease which is sufficient to cause a drop below the diamond-stable area where conversion does not occur. On the other hand, if in order to guarantee against this failure one chooses to operate at a sufficiently high point to ensure that the change of volume will not cause the pressure to fall below the diamond-stable area, one obtains diamond crystals that are smaller and of poorer quality for the reasons indicated in the aforegoing.

In accordance with the present invention this problem is eliminated by counter-action the tendency to pressure change which takes place in the reaction chamber on account of the change of volume of the reaction material following increase of the pressure and temperature in the chamber to a chosen optimum point of the pressure and temperature area within which one is to work, this counter-action being effected by means of a compensation pressure produced in the manner appearing from the description given in the following as concerns the apparatus in accordance with the invention illustrated in FIGS. 3 to 6 and its mode of operation in connection with the manufacture of synthetic diamonds. It should be kept in mind, however, that both the mode of operation and the apparatus in accordance with the invention are applicable also to other material treatments where it is desired to maintain a constant pressure in a high-pressure apparatus.

The apparatus in accordance with FIG. 3 comprises in a manner known per se a pressure cylinder having a central reaction chamber 2 and two punches or pressure pistons 3 which by means of high-pressure presses 4 may be inserted from each end of the reaction chamber 2 in order to submit a body of reaction material 5 placed in the reaction chamber to a high pressure. The cylinder 1 may consist of steel or other suitable material, such as a ceramic material, e.g. boric carbide (which is electrically conductive) or aluminium oxide (which is not electrically conductive), and surrounded by a band consisting of three concentric steel jackets 6, 7, 8 of cylinder shape, the hardness of which increases in the inwards direction and the ductility of which increases in the outwards direction. The inner jacket 6 thus is the hardest one and the outer jacket 8 the most ductile one.

In the embodiment illustrated of the apparatus in accordance with the invention the pressure cylinder 1 abuts against the inner jacket 6 over a limited area of its outer periphery. This area may be a comparitively small annular and radially inwardly extending support face 9 at the centre portion of the inner circumference of the inner jacket 6. On either side of the annular support 9 the outer peripheral face of the pressure cylinder 1 defines a gap 10 relative to the inner jacket 6. Each gap 10 communicates with one annular chamber 11 each, defined between the pistons 3, the inner jacket 6, the corresponding end of the pressure cylinder 1 and a piston portion 12. The two gaps 10 and the two chambers 11 are completely filled with a hydraulic medium, preferably a liquid such as oil. This fluidum forms a support pressure medium for the pressure cylinder and the pistons. The reaction material 5 in the pressure chamber may be surrounded by a sealing material 13, such as pyrophyllite. In accordance with the invention a liquid and particularly an oil, is to be used as the support pressure medium in the gaps 10 and the chambers 11, and as will appear from the following, this support pressure medium is used for the particular purpose of the invention.

The annular space 10, 11 at each side of the ends of the pressure cylinder 1 is connected via a channel 14 to a valve 15 which for the sake of simplicity is illustrated as a spring-loaded return valve although it is to be understood that the valves 15 should be valves of a kind that may be carefully adjusted and set to the desired opening pressure in the direction shown in FIG. 3 and that they should fulfil the purposes described in the following.

The piston 12 had for its purpose to exert a pressure on the oil (or possibly some other support pressure medium) in the spaces 10, 11 while simultaneously the piston 3 is forced into the reaction chamber to exert pressure on the reaction material 5. In the embodiment illustrated, the portion 16 of the pressure piston 3 which is to penetrate into the pressure chamber 1, consists of hard metal such as tungsten carbide, whereas the piston 12 to pressurize the oil, consists of two steel rings 17, 18 mounted on the pressure piston 3. The rear one of these rings, ring 18 rests against the press 4 whereas the front ring 17 has a shape which conforms to the cavity of the inner jacket 6 into which cavity this ring may be inserted, and it is sealed-off against the inner jacket by means of one or several pressure-resistant sealing rings 19.

When the two piston portions 16, 17 of the piston unit 3, 12 thus are forced into its associated cylinder chamber the reaction material 5 and the pyrophyllite sealing body 13 on the one hand, and the oil inside spaces 10, 11 on the other will be pressurized, whereby the oil will support the pressure cylinder 1 and on account of its pressure take load off the bursting strength exerted on the cylinder 1 and the pistons 3.

Figure 7:
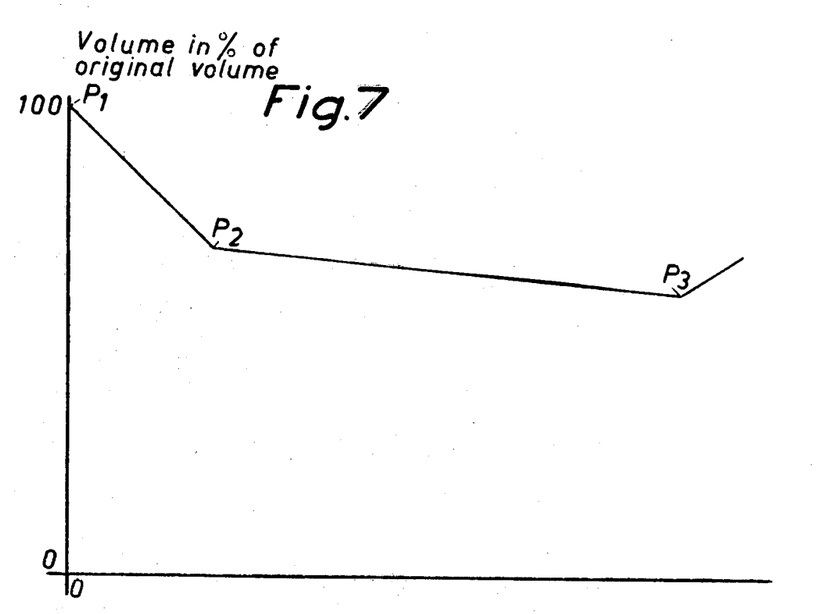
Figure 8:
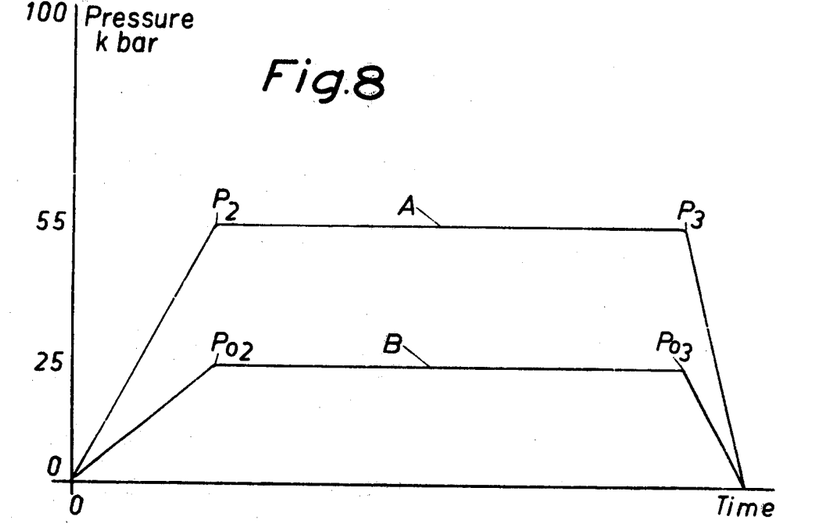

The diagram in FIG. 8 illustrates in a somewhat simplified manner the method in accordance with the invention to compensate for pressure drop as a result of the process of volume change — illustrated in a simplified manner in the diagram of FIG. 7 — occurring over the same period as the phase conversion of the reaction material 5 in the reaction chamber 2.

FIG. 7 illustrates how the volume of the reaction material from a point $P_1$ corresponding to the original volume is rapidly lowered to a point $P_2$ in connection with the exertion on the graphite 5 inside the reaction chamber 2 of a pressure at which the phase conversion to diamond begins. Thereafter, the volume of the reaction material drops along a less steep curve, here shown as a straight line, to a point $P_3$, where the phase conversion has ceased and the pressure is reduced, whereby the volume of the material will again increase but not sufficiently to resume the original volume. In FIG. 8 curve A represents the pressure increase in the chamber 2 from $P_1$ to $P_2$ along a steeply rising curve section, whereupon the pressure is kept constant to point $P_3$ where the phase conversion is assumed to have ceased and the pressure is reduced. The curve B shows the oil pressure over the same period of time. From point $P_1$, the oil pressure is to be increased to a point $Po_2$ and thereafter be kept constant to a point $Po_3$, where the phase conversion process on the whole has ceased.

The oil volume is preferably chosen so that the pressure at point $Po_3$ substantially corresponds to the maximum compression of the oil. This pressure which may amount to e.g. 25 kbar forms (in addition to a support pressure to the pistons and the pressure cylinder) a compensation pressure acting as a counter-force on the piston unit 3, 12. Should this pressure be exceeded, the valves 15 are to allow exhaust of essentially exactly the amount of oil required to maintain the oil pressure at the chosen level (in this case 25 kbar). In the diagram in FIG. 8 points $P_2$ and $PO_2$ should on the whole be arrived at simultaneously, which is possible by choosing correct dimensions or regulation of the oil volume.

When the volume of the reaction material decreases along the curve from point $P_2$ to point $P_3$, the counter-pressure on the press piston 3 is decreased and consequently an increased pressure is transferred from the press 4 via the piston 12, should a constant pressure be exerted on the piston unit by means of the press. When the oil pressure tends to increase above the maximum oil pressure set by means of the valves 15, the valves 15 discharge oil, and on account of the reduced oil volume the piston unit 3, 12 may be displaced to a corresponding degree inwards, which means that the piston maintains the pressure in the reaction chamber 2 at an essentially constant level.

Instead of the necessity to strictly adjust the oil volume in the oil spaces from the beginning it is possible during the first pressure increase phase between points $P_1$ and $P_2$ in the diagram of FIG. 8, to exhaust oil by means of e.g. a pair of oil charging valves 20 which are connected to one pump 21 each, making it possible to arrive at points $P_2$ and $Po_2$ at the same time. This regulation may be made automatic with the aid of means well known within the regulating technique.

In accordance with the illustrated embodiment of the apparatus in accordance with the invention the oil piston 12 of the piston unit 3, 12 consists of two separate steel rings 17, 18 or one integral one, mounted on the pressure piston 3 and isolated from the piston 3 and from the press 4 by means of an insulation material 22. Through the main piston 3 or via an electric wire incorporated into the main piston and only indicated by a broken line 23, electric current is conducted from a connection line 24 to the reaction material 5 for direct electrical heating of the reaction material, in case the latter consists of graphite or some other electrically conductive material, or else indirect heating is used, should the reaction material be non-conductive. In accordance with the invention the aim is to achieve a comparatively long period of reaction (several seconds, minutes, hours or even weeks), and in this case it is possible to use a conventional source of current, e.g. a three-phase A.C. generator having the effect of 100 kW and a voltage of 40V. If, in some cases, short heating processes (reaction periods) are wanted, some other source of current may be used, e.g. a capacitance discharge aggregate.

It is important that the oil volumes are not altered as a result of an alteration of the temperature, and for this purpose a shrinkage fit 6, 7, 8, and more precisely its inner jacket 6 is arranged to be cooled by a cooling medium, particularly in the oil area. For this purpose the apparatus is equipped with suitable passageways for water cooling and these cooling passageways are arranged so as to weaken the substance of the inner jacket 6 as little as possible, while at the same time allowing the most efficient cooling possible. The water cooling device illustrated comprise a number (e.g. four) of cooling water supply and discharge tubes 24' mounted so as to permit their ends to project into a support ring 25 resting on the middle jacket 7, and also a number of radial communication channels 26 formed in the support ring 25, axially extending reception and distribution channels 27 formed between the inner jacket 6 and components 7, 25, as well as a number of parallel cooling channels 28 extending around the outer peripheral face of the inner jacket 6 between the inner jacket and components 7, 25. This arrangement makes it possible to maintain the walls around the oil and the oil itself at a constant temperature of about 60° C without seriously weakening the substance of the band 6–8, and particularly the inner jacket 6.

Figure 6:
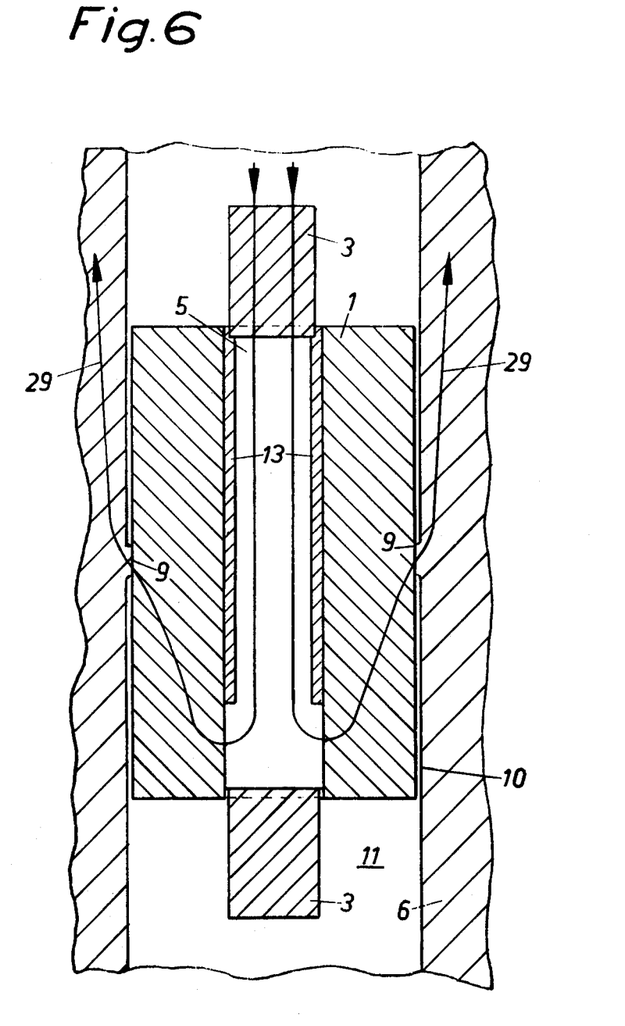
FIG. 6 illustrates schematically a longitudinal sectional view showing the passage of current through the reaction substance in the apparatus in accordance with FIG. 3, and FIGS. 7 and 8 are two diagrams of which the diagram of FIG. 7 illustrates the change of volume of the reaction material during a pressure cycle of the conversion of graphite into diamond, whereas the diagram of FIG. 8 illustrates the pressure cycle itself and the compensation for the pressure decrease that the volume reduction would normally follow.

FIG. 6 illustrates how the above described annular support face 9 on the inside of the inner jacket 6 may be utilized as a current conducting bridge to conduct the electric current (the current paths indicated at 29), used to heat the reaction material to the desired temperature range which in the case of manufacture of synthetic diamonds in the optimum area of curve Fe in the diagram of FIG. 1 lies in the vicinity of 1500° C. The annular support surface 9 need not, however, be continuous but could be perforated buy axial oil passage channels extending between the two oil volumes on either side of the pressure chamber.

The invention is not limited to diamond manufacture but is applicable also to examination and treatment of other materials than carbonaceous ones in cases where it is desirable that during the examination or treatment process the pressure be maintained at certain desired values, independently of the volume reduction of the material being treated. As an example may be mentioned that the apparatus may be used for the manufacture of cubic boron nitride crystals. The apparatus may also be used for the manufacture of semi-conductive diamond crystals through incorporation of tracer elements (such as boron or aluminium, see Swedish Patent Specifications Nos. 227 336 and 303 481) in the diamond crystal lattice, which may require very careful maintenance of the pressure at a certain value during the treatment process, particularly if graphite or other carbon is the starting material. Furthermore, it is possible to use the apparatus in accordance with the invention to study the qualities of diamond or many other materials when exposed to very high and essentially constant pressures over shorter or longer periods of time.

The invention is not either limited to the apparatus described above as concerns its details, as the apparatus lends itself to modifications of various kinds to obtain the purposes defined. For instance, a reduction of the support pressure in the annular space 10, 11 to allow the pressure of the reaction chamber 2 to be maintained substantially constant during the phase conversion of the material to be treated — or even allow a pressure increase in the chamber 2 — may be achieved in another way than through outlet of pressure fluid from the annular spaces 10, 11. Such pressure reduction may be achieved in that the value of the pressure applied on the pressure fluid is reduced. The apparatus described therefore is to be regarded only as an embodiment, preferred at present, of an apparatus conceived to perform the method in accordance with the invention, which may be performed in apparatuses of other kinds than the one illustrated.

The use, as described, of a support pressure medium as the pressure compensating medium is preferred when the pressure cylinder and possibly also the pistons are considered in need of hydraulic support, and in this case the piston acting on the support pressure medium and/or the volume of the support pressure medium and/or the pressure cylinder interior and exterior circumferential surfaces may be so adjusted relative to one another that the support pressure (in the case related to FIG. 8, 25 kbar) acting on the outer circumferential surface of the pressure cylinder balances the pressure (in the case described in FIGS. 1 and 8, 55 kbar) inside the pressure cylinder, in which case the value of the bursting strength becomes zero. This value might even be negative. Furthermore, the described support surface 9 for the pressure cylinder otherwise mounted in a floating manner in the support pressure medium may be arranged on the pressure cylinder proper or in some cases be dispensed with.

The apparatus described above and illustrated in the drawings uses one and the same press both for the operation of forcing the pistons 3 into the high-pressure chamber 2 in order to compress the material to be treated and for urging the steel rings 17 into the space 11 in order to compress the pressure compensation medium. The invention, however, also embraces an apparatus of the kind wherein two independently working means provide the required pressure force on the piston 3 (or pistons 3) and on the steel ring 17 (or steel rings 17). The pressure force acting on the steel ring 17 may be adjustable in such a manner that upon achievement of the desired maximum pressure it maintains the ring in depressed position during the entire treatment process. The pressure force acting on the piston 3 may be so adjustable that at the momemt of phase conversion of the material treated — when a volume reduction occurs in the high-pressure chamber — an additional pressure is supplied to the pressure force so adjusted that the treatment pressure is retained at the predetermined values closely above the phase curve of the phase diagram relating to the particular material treated in the high-pressure chamber. This pressure in addition may be achieved through the intermediary of a means which senses the state of the treatment pressure — or rather the tendency of the treatment pressure to decrease. In an apparatus of this kind thus no pressure equalizing device for the pressure compensation medium is required.

In certain apparatuses, e.g. of the kind wherein no support pressure is to be used, the spaces intended for the pressure compensation medium (preferably oil, but also other media that are liquid at the working pressures concerned may be used) as also the devices cooperating with the press or the pressure pistons to pressurize the compensation medium may be arranged in a different manner convenient and suitable for the apparatus in question.

What I claim is:

1. The method of treating material in high-pressure chambers by increasing the pressure exerted on said material to a desired pressure level at which the volume of the material is reduced as a result of a reactional or phase conversion process and thereafter maintaining the pressure during the desired pressure phase time, said method comprising the steps of placing the material to be treated in a high-pressure container, surrounding entirely the said high pressure container by a pressure compensating medium, said medium being a liquid and of such a character to maintain its liquid characteristics at the maximum pressure experienced during said treatment, applying a force on the material and on the pressure compensating medium via a stepped piston with its end portion arranged to enter into one end of said pressure container and thereby defining said high-pressure chamber and a second portion of larger diameter than said end portion arranged to fit a cylindrical chamber containing the pressure compensating medium, whereby an increasing force causes an increase of the pressure on the material in the high-pressure chamber and on the medium in the cylindrical chamber, using valve means to regulate the volume of the pressure compensating medium during said increasing of the force as well as during the pressure phase time, applying a constant force on the piston during the pressure phase time and thereby maintaining the constant pressure on the material in the high-pressure chamber also during the phase conversion process by regulation of the volume of said pressure compensating medium, and using the pressure compensating medium surrounding the said high-pressure container as a pressure supporting medium to counteract the pressure created within the high-pressure chamber.

* * * * *